Figures 1, 4, 5:
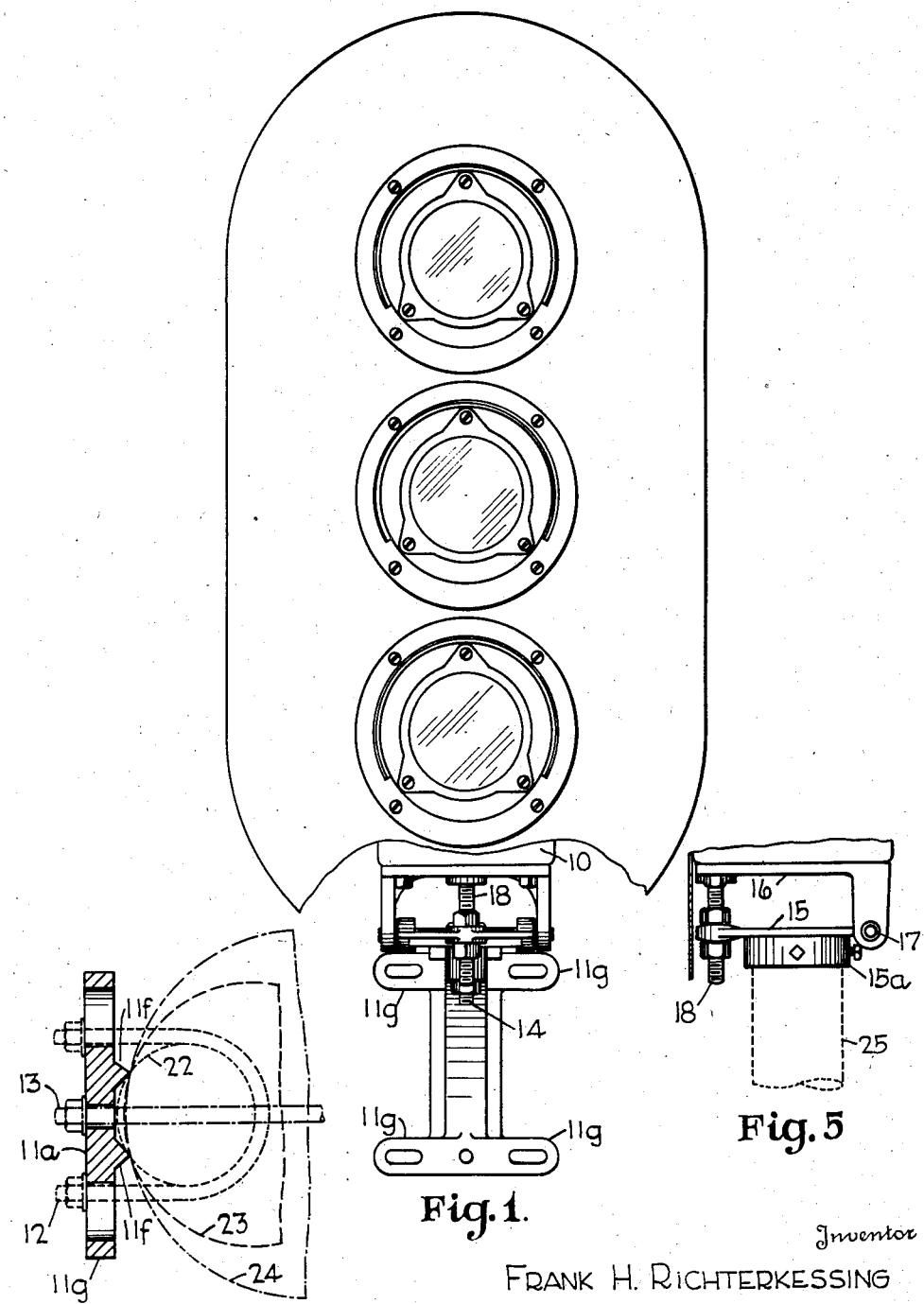

Jan. 1, 1935.  F. H. RICHTERKESSING  1,985,951
LAMP BRACKET
Filed May 23, 1932    2 Sheets-Sheet 1

Inventor
FRANK H. RICHTERKESSING
By John L. Milton
Attorney

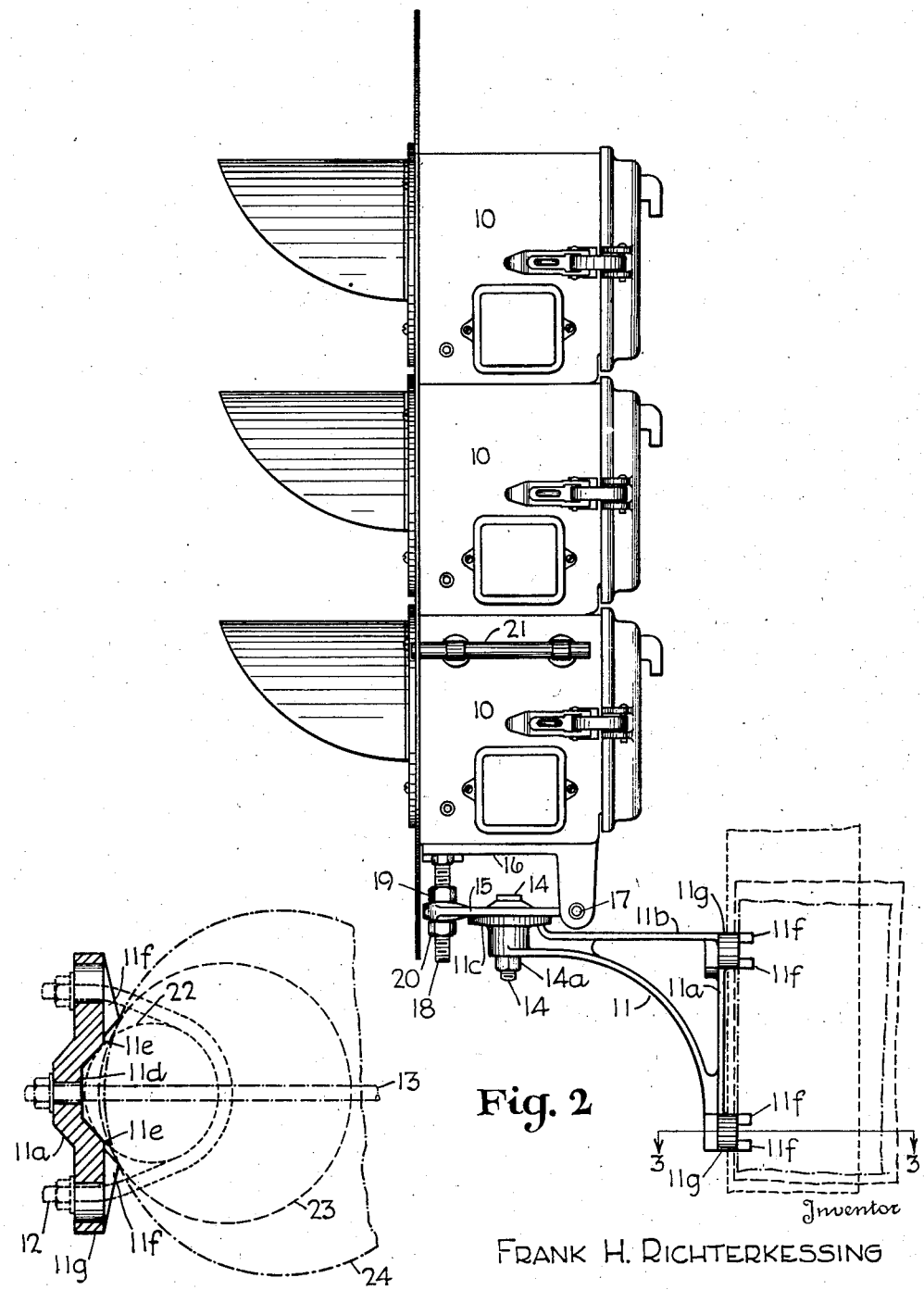

Patented Jan. 1, 1935

1,985,951

UNITED STATES PATENT OFFICE 1,985,951

LAMP BRACKET

Frank H. Richterkessing, Louisville, Ky.

Application May 23, 1932, Serial No. 612,877

5 Claims. (Cl. 248—30)

My invention relates to the class of devices attached to a pole for supporting light cases which are used in connection with signals for railways.

An object of the invention is to provide means for adjusting the light cases in order that the emanating beams of light can be directed along a desired path. To accomplish this in a very easy manner, means are provided for adjusting the lamps in two planes, i. e. horizontally and vertically and then providing means for securing the device after the desired selected adjustment has been effected.

Another object consists of providing the support, commonly known as a bracket with means for securing it to a line pole or other pedestal in a very substantial manner with the use of ordinary tools.

A further object consists of fastening the contacting surface of the bracket in order that it will be self-adapting to a wide range of pole diameters and of the various materials, such as steel and wooden poles.

The accompanying drawings illustrate a preferred form and a modification of the invention and are incorporated into the specification.

Figure 1 is an elevational front view of the bracket together with its adjustable members and a three light lamp case supported thereon, the back ground shield being broken away to clear the view of major parts of the bracket. Fig. 2 is a side elevation of Fig. 1. Fig. 3 is a cross-sectional view of the bracket in Fig. 2 along the line 3, 3. Fig. 4 is a modified form of Fig. 3. Fig. 5 is a fragmentary elevation of a pole top mounting.

In the drawings, 10 represents light cases which are mounted in tier formation upon bracket 11 which can be attached to poles either by U bolts as shown by 12 in dotted lines of Fig. 3, or through bolts indicated by 13, which are preferably used for relatively large diameter poles. Bracket 11 is formed with a vertical back member 11a and horizontal projecting member 11b which terminates in a preferably round perch 11c through the center of which passes a bolt hole for receiving bolt 14. On this perch is disposed a plate 15 to which is articulated an upper leaf 16 at bearing 17 thus forming a hinge, 15 being the dead leaf and 16 the movable leaf. Screw stud 18 is secured, preferably fused, into leaf 16 and passes through an elongated slot of the lower leaf which is fashioned with double convex surfaces pitched on arcs in order that nuts 19 and 20 when set will have their inner surfaces contacting with the convex surfaces on a line axial to 18 to permit an even and substantial adjustment as leaf 16 pivots on bearing 17. Bolt 14 is provided with a nut 14a which when loosened will permit the dead leaf to be rotated to any desired position and thereby carrying the cases 10 which are secured to leaf 16 along with same.

It will thus be seen that the operator can locate his object or area through sight 21 and then secure the bracket by means of the nut with a minimum of effort.

The vertical member 11a of the bracket while falling practically within a plane has projections and contours as shown in the cross-section of Fig. 3. By depressing the central portion 11d of 11a, lugs or corners 11e are left projecting to engage the cylindrical surfaces of the pole as shown in dotted lines 22. Integral with 11a are projected lugs 11f, in order that a wider or better grip on a larger pole may be had, such as poles 23, 24 as shown in dotted lines. The two groups of lugs, top and bottom, project from remote areas of the surface of the vertical back member 11a in order to effect rigidity, vastly in excess of results which would be procured from a single group of corresponding lugs.

The laterally projecting lugs 11g are fashioned with perforated elongated slots to accommodate the U bolts of varying dimensions, which may be selected according to the diameter of poles on which the installation is to be made.

It will be noted that means are provided for effecting solid contacts with poles of varying diameter with the use of a single bracket, thus dispensing with the use of the customary adapters heretofore employed by the manufacturer. The benefit derived from this type of bracket extends to the service men and relieves them of the necessity of carrying a stock of brackets of varying proportions and/or improvising make-shift blocks and supports to effect the necessary dependable installation.

The modification illustrated in Fig. 5 shows the dead leaf 15 of the hinge fashioned with a skirt 15a for mounting directly on top of a pole 25.

While the preferred form of my invention has been illustrated and described many variations, minor or major, can be made without departing from the spirit of my invention, therefore, I wish to be limited only by the appended claims.

I claim:—

1. In combination, a supporting pole, and a bracket fashioned with a vertical back from which extend lateral projecting arms with perforated slots and disposed in substantially the same plane; the rear surface of said back and arms being fashioned with one set of angularly disposed lugs developed by adjacent depressions and another set of angularly disposed lugs developed by projections; said lugs being so disposed that only one set will contact with a pole of greater or lesser diameter than one of a critical diameter.

2. In combination, a supporting pole, and a bracket fashioned with a vertical back from which extend lateral projecting arms with perforated elongated slots and disposed in substantially the same plane; the rear surface of said back and arms being fashioned with one set of angularly disposed lugs developed by adjacent depressions and another set of angularly disposed lugs developed by projections; said lugs being so disposed that only one set will contact with a pole of greater or lesser diameter than one of a critical diameter and a U bolt embracing said pole and having its legs disposed in said elongated slots.

3. In an adjustable bracket comprising angularly disposed members one of said members being fashioned with a substantially horizontally flat perch on which is pivotally mounted a turntable which forms the dead leaf of a hinge to which is articulated a movable leaf which is organized to support a load, said movable leaf being provided with a fixed depending stud extending through said dead leaf means for adjusting and locking same in terms of and to said dead leaf, the other said member being fashioned with a vertical back with perforated slots; the rear surface of said back being fashioned with independent groups of angularly disposed projecting lugs which are so disposed that they can contact with the surface of poles of varying diameters, and means for securing said bracket to said supporting pole.

4. In an adjustable bracket comprising angularly disposed members one of said members being fashioned with a substantially horizontal flat perch on which is pivotally mounted a turntable which forms the dead leaf of a hinge to which is articulated a movable leaf which is organized to support a load, said movable leaf being provided with means for adjusting and locking same in terms of and to said dead leaf, the other said member being fashioned with a vertical back perforated elongated slots and disposed in substantially the same plane; the rear surface of said back being fashioned with one set of angularly disposed projecting lugs developed by depressions and another set of angularly disposed lugs developed by projections; said lugs being so disposed that only one set will contact with a pole of greater or lesser diameter than one of a critical diameter.

5. In combination, a supporting pole, and a bracket fashioned with a vertical back from which extend lateral projecting arms with perforated slots and disposed in substantially the same plane; the rear surface of said back and arms being fashioned with one set of angularly disposed lugs developed by adjacent depressions and another set of angularly disposed lugs developed by projections; said lugs being so disposed that only one set will contact with the surface of a pole of greater or lesser diameter than one of a critical diameter, and a through bolt passing through said bracket and said pole.

FRANK H. RICHTERKESSING.